United States Patent [19]

Horiuchi

[11] 4,434,774
[45] Mar. 6, 1984

[54] VAPORIZER FOR A LIQUEFIED PETROLEUM GAS ENGINE

[75] Inventor: Tomofusa Horiuchi, Yokohama, Japan

[73] Assignee: Nissan Motor Company, Limited, Yokohama, Japan

[21] Appl. No.: 393,791

[22] Filed: Jun. 30, 1982

[30] Foreign Application Priority Data

Sep. 25, 1981 [JP] Japan ................. 56-151545

[51] Int. Cl.³ ..................... F02G 5/00; F02M 31/02
[52] U.S. Cl. ............................. 123/557; 123/525; 123/41.2; 48/180 C
[58] Field of Search ............. 123/525, 527, 557, 41.2; 48/180 C, 180 R

[56] References Cited

U.S. PATENT DOCUMENTS

| | | | |
|---|---|---|---|
| 2,248,222 | 7/1941 | Ensign | 48/180 C |
| 2,744,387 | 5/1956 | Reed et al. | 123/557 |
| 2,788,779 | 4/1957 | Mengelkamp et al. | 123/557 |
| 2,821,843 | 2/1958 | Mengelkamp et al. | 123/527 |
| 3,184,295 | 5/1965 | Baverstock | 123/557 |
| 4,092,963 | 6/1978 | Vrooman | 123/557 |

Primary Examiner—Charles J. Myhre
Assistant Examiner—E. Rollins Cross
Attorney, Agent, or Firm—Schwartz, Jeffery, Schwaab, Mack, Blumenthal & Koch

[57] ABSTRACT

A vaporizer for a liquefied petroleum gas engine with a cooling system employing coolant, includes a housing having first, second, and third chambers. The housing has a fuel inlet port which is connected to a lower portion of the first chamber to supply the latter with liquid fuel. An upper portion of the first chamber communicates with the second chamber to supply the latter with fuel. The cross-sectional area of the fuel inlet port is smaller than that of the first chamber so that the speeed of fuel flow through the first chamber will be lower than that of fuel flow through the fuel inlet port. The second chamber is in turn connected to the engine to supply the latter with fuel. A valve controls the communication between the first and second chambers to regulate pressure in the second chamber to such a level that liquid fuel will vaporize. The third chamber is connected to the cooling system to be supplied with the coolant. The third chamber is located near the first and second chambers in such a manner as to surround the first chamber so that the coolant in the third chamber will heat both liquid fuel in the first chamber and fuel vapor in the second chamber.

6 Claims, 2 Drawing Figures

VAPORIZER FOR A LIQUEFIED PETROLEUM GAS ENGINE

BACKGROUND OF THE INVENTION

1. Field of the Invention

This invention relates to a vaporizer for an engine, such as the internal combustion type, using liquefied petroleum gas (LPG) as fuel.

2. Description of the Prior Art

Generally, an LPG internal combustion engine has a vaporizer for liquid fuel. The vaporizer supplies fuel vapor to the engine by way of a carburetor.

Insufficient vaporization of fuel impairs the response of fuel supply and thus acceleration, and reduces accuracy in fuel metering. In order to improve fuel vaporization, a preheater is conventionally used to heat liquid fuel before it enters the vaporizer.

Some vaporizers incorporate preheaters to simplify the fuel supply systems of the engines. However, such a vaporizer with a preheater is unsatisfactory from the standpoint of improvement of vaporization of fuel.

SUMMARY OF THE INVENTION

It is an object of this invention to provide a preheater-equipped vaporizer for an LPG engine which adequately improves vaporization of fuel.

In accordance with this invention, a vaporizer for a liquefied petroleum gas engine with a cooling system employing coolant, includes a housing having first, second, and third and fourth chambers. The housing has a fuel inlet port which is connected to a lower portion of the first chamber to supply the latter with liquid fuel. An upper portion of the first chamber communicates with the second chamber to supply the latter with fuel. The cross-sectional area of the fuel inlet port is smaller than that of the first chamber so that the speed of fuel flow through the first chamber will be lower than that of fuel flow through the fuel inlet port. The second chamber communicates with the fourth chamber which in turn is connected to the engine to supply the latter with fuel. A valve controls the communication between the first and second chambers to regulate pressure in the second chamber to such a level that liquid fuel will vaporize. Communication between the second and fourth chambers is also controlled. The third chamber is connected to the cooling system to be supplied with the coolant. The third chamber is located near the first and second chambers in such a manner as to surround the first chamber so that the coolant in the third chamber will heat both liquid fuel in the first chamber and fuel vapor in the second chamber.

The above and other objects, features and advantages of this invention will be apparent from the following description of a preferred embodiment thereof, taken in conjunction with the drawings.

DESCRIPTION OF THE PREFERRED EMBODIMENT

Figure 1:
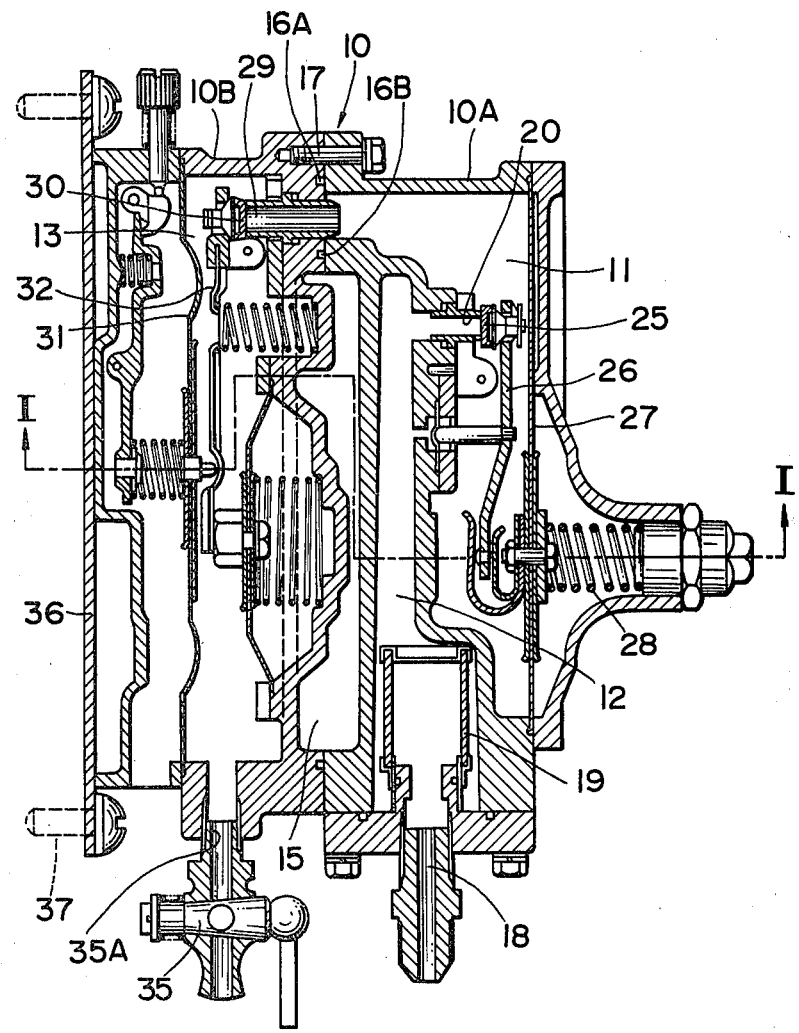
FIG. 1 is a vertical section of a vaporizer of this invention.

With reference to the drawings, there is shown a vaporizer for an LPG internal combustion engine 50 according to this invention, which has a housing 10 divided into two parts 10A and 10B along a vertical seam. The housing 10A is provided with a primary chamber 11 and a liquid fuel chamber 12 adjoining the primary chamber 11. The housing 10B includes a secondary chamber 13. The housing 10 is provided with a hot-coolant chamber 15 along the seam between the two parts 10A and 10B. The housings 10A and 10B are attached together by means of bolts 17 with sealing members 16A and 16B interposed between the two parts 10A and 10B.

The liquid fuel chamber 12 is supplied with liquid fuel, that is, LPG liquid, by way of a fuel inlet 18 formed in the lower portion of the housing 10A. A filter 19 is disposed in the chamber 12 to remove contaminants from the liquid fuel entering the chamber 12. The chamber 12 is generally in the form of a rectangular prism, and has an inside cross-sectional area significantly greater than that of the fuel inlet 18. A horizontally-extending communicating port 20 leading to the primary chamber 11 opens to the upper portion of the liquid fuel chamber 12.

Figure 2:
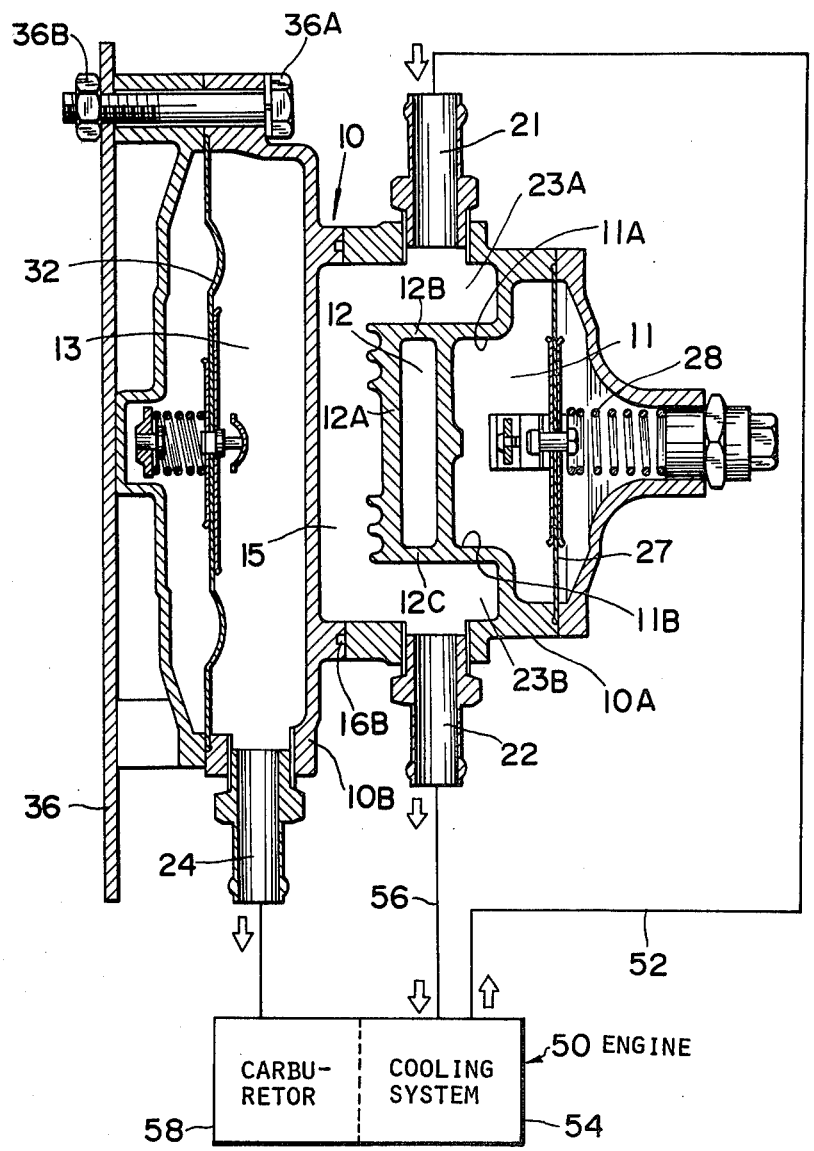
FIG. 2 is a diagrammatic view of an engine and includes a horizontal cross-sectional view of the vaporizer taken along line I—I of FIG. 1.

The hot-coolant chamber 15 has a U-shaped or channel-shaped horizontal cross-section as shown in FIG. 2, and is located near the liquid fuel chamber 12 so as to directly oppose the back 12A and both the sides 12B and 12C of the chamber 12. In other words, in horizontal cross-section, the liquid fuel chamber 12 is surrounded on three sides by the hot-coolant chamber 15, or is within a channel of the chamber 15. The hot-coolant chamber 15 extends vertically to approximately the same extent as the liquid fuel chamber 12.

Hot-coolant inlet 21 and outlet 22 open to opposite sides of the hot-coolant chamber 15. The hot-coolant inlet 21 is connected by a rubber hose 52 to a coolant channel of an engine cooling system 54. The hot-coolant outlet 22 is connected by way of a rubber hose 56 to the inlet of a water pump (not shown) of the engine cooling system 54. The chamber 15 is supplied with hot coolant from the engine cooling system 54 by way of the inlet 21. The coolant is drawn from the chamber 15 into the engine cooling system 54 by way of the outlet 22.

As shown in FIG. 2, the distal ends 23A and 23B of the hot-coolant chamber 15 extend beyond the liquid fuel chamber 12 and far enough horizontally to border opposite sides 11A and 11B of the primary chamber 11, causing the chamber 11 to be effectively heated by the hot coolant. Since the hot-coolant chamber 15 is adjacent to the liquid fuel chamber 12 and surrounds partially it, the liquid fuel in the chamber 12 is even more effectively heated by the hot coolant.

A diaphragm 27 deformably secured to the housing 10A is disposed in the primary chamber 11, and is connected to a primary valve 25 by means of a lever 26 in order to drive the valve 25. The diaphragm is biased by a spring 28. The primary valve 25 is disposed in the primary chamber 11 to control the opening of the communicating port 20 to the chamber 11. The diaphragm 27 is deformed to drive the primary valve 25 in response to pressure in the primary chamber 11 and the force of the spring 28, so as to regulate the pressure of the primary chamber 11 to a predetermined low level, for example, 0.3 kg/cm$^2$. The primary valve 25 and the driving mechanism therefor are generally designed in a conventional manner. Liquid fuel from the chamber 12 vaporizes as it enters the low-pressure chamber 11 by way of the communicating port 20 and the primary valve 25.

The upper portion of the primary chamber 11 communicates with the upper portion of the secondary chamber 13 by means of a communicating port 29. A secondary valve 30 is disposed in the secondary chamber 13 to control the opening of the communicating port 29 to the secondary chamber 13, and is connected by means of a lever 32 to a diaphragm 31 which sealingly divides the secondary chamber 13. When the pressure in the secondary chamber 13 drops below a predetermined level, the secondary valve 30 opens the communicating port 29 to the secondary chamber 13 to admit fuel vapor from the primary chamber 11 into the secondary chamber 13.

As best seen in FIG. 2, a fuel outlet 24 is provided on a side of the secondary chamber 13 to supply fuel vapor from the secondary chamber 13 to a carburetor 58 disposed in an engine air intake passage. As shown in FIG. 1, a drain port 35A leading to the lower portion of the secondary chamber 13 is provided to discharge contaminant, such as tar, from the secondary chamber 13. A drain cock 35 is disposed in the drain port 35A to controllably block the port 35A.

Turning again the FIG. 2, a bracket 36 is secured to a vertical surface of the housing 10 by combinations of bolts 36A and nuts 36B. The head of each bolt 36A engages the housing 10, and the shaft thereof extends through the wall of the housing 10 and through the bracket 36. Each nut 36B threadedly engages the tip or distal end of the associated bolt 36A projecting from the bracket 36, and abuts the bracket 36 to press the latter against the housing 10. The bracket 36 is attached by means of bolts 37 to a base (not shown), such as the body of a vehicle driven by the engine, to mount the housing 10 to the base in such a manner that the housing 10 will be aligned vertically, as shown in FIG. 1.

In operation, liquid fuel is supplied from a pressure-tight fuel tank (not shown) to the liquid fuel chamber 12 via the fuel inlet 18. Liquid fuel in the chamber 12 is heated by hot coolant in the chamber 15 surrounding the chamber 12. Since the cross-sectional area of the chamber 12 is considerably larger than that of the fuel inlet 18, the speed of fuel flow through the chamber 12 is significantly lower than that of fuel flow through the fuel inlet 18. As a result, the temperature of liquid fuel in the chamber 12 is effectively raised.

Hot liquid fuel moves up through the chamber 12, and enters the primary chamber 11 via the communicating port 20 at a rate depending on the degree of opening of the primary valve 25. Upon entering the primary chamber 11, liquid fuel instantaneously changes into vapor due to the reduction of pressure. The pressure of fuel vapor in the primary chamber 11 is regulated to the predetermined level by the cooperation of the primary valve 25, the lever 26, the diaphragm 27, and the spring 28.

Fuel vaporized in the primary chamber 11 is admitted into the secondary chamber 13 via the communicating port 29 in accordance with the degree of opening of the secondary valve 30. Fuel vapor is drawn from the secondary chamber 13 into a venturi of the carburetor 58 via the fuel outlet 24. Vanturi vacuum (vacuum caused by the vanturi) developed in the carburetor 58 is supplied to the secondary chamber 13 to act on the surface of the diaphragm 31. Thus, the diaphragm 31 drives the secondary valve 30 in response to the rate of air flow into the engine via the carburetor 58 so that the carburetor 58 will supply a mixture of essentially constant air-fuel ratio to the engine.

Preheating liquid fuel in the chamber 12 by hot coolant in the chamber 15 facilitates vaporization of fuel in the primary chamber 11. Even when the amount of fuel required increases, for example, during heavy-load operation of the engine, and consequently unvaporized fuel might develop at the bottom of the primary chamber 11, the fuel will be quickly vaporized since the primary chamber 11 is also subject to heating by hot coolant in the chamber 15.

In this way, liquid fuel can always be completely vaporized in the primary chamber 11, so that pressure in the primary chamber 11 is stably regulated to the predetermined level. Therefore, the rate of fuel flow into the secondary chamber 13 is precisely controlled by the secondary valve 30, and the rate of fuel flow to the engine faithfully follows variations in the degree of opening of the secondary valve 30, that is, variations in the load on the engine.

If un-vaporized fuel develops in the primary chamber 11 when the secondary valve 30 is closed, fuel will be supplied to the engine at an excessive rate upon subsequent re-opening of the secondary valve 30, since the un-vaporized fuel will be vaporized, raising the pressure in the primary chamber 11 while the secondary valve 30 is closed. On the other hand, the vaporizer of this invention prevents accumulation of un-vaporized fuel as described hereinbefore, preventing engine stall due to the described fuel over-supply problem.

Since the communicating port 20 is located high in the liquid fuel chamber 12, hot liquid fuel is preferentially admitted into the primary chamber 11, resulting in easy vaporization of fuel. What is more, high-specific-gravity solid contaminants will be prevented from entering the port 20 and thus adhering to the primary valve 25. Since the communicating port 20 extends horizontally, if vapor should develop in the port 20, the vapor would not force liquid fuel into the primary chamber 11 via the primary valve 25.

Since the liquid fuel chamber 12 and the hot-coolant chamber 15 have simple shapes and the housing 10 is divided into two parts along the vertical seam, the chamber 15 can be easily formed, for example, by die casting.

It should be understood that further modifications and variations may be made in this invention without departing from the spirit and scope of this invention as set forth in the appended claims.

What is claimed is:

1. A vaporizer for a liquefied petroleum gas engine having a cooling system employing coolant, the vaporizer comprising:
   (a) a housing having first, second, third, and fourth chambers;
   (b) the housing having a fuel inlet port connected to a lower portion of the first chamber to supply liquid fuel to the first chamber;
   (c) a first port disposed at an upper portion of the first chamber for communicating with the second chamber to supply fuel to the latter;
   (d) said fuel inlet port having a cross-sectional area smaller than that of the first chamber whereby fuel flow through the first chamber will be at a lower speed than that of fuel flow through the fuel inlet port;
   (e) a second port for communicating between the second chamber and the fourth chamber;

(f) an outlet for connecting the fourth chamber to the engine to supply fuel to the latter;

(g) mans for controlling flow through said first port for regulating pressure in the second chamber to a level whereby liquid fuel will vaporize; and (h) means for controlling flow through said second port;

(i) the third chamber being connected to the cooling system to be supplied with the coolant, the third chamber being located adjacent to the first and second chambers and at least partially surrounding the first chamber so that the coolant in the third chamber will heat both liquid fuel in the first chamber and fuel vapor in the second chamber.

2. A vaporizer as recited in claim 1, wherein the third chamber has a channel-shaped cross-section and the first chamber is within the channel of the third chamber.

3. A vaporizer as recited in claim 2, wherein distal edges of the third chamber extend beyond the first chamber and border the second chamber.

4. A vaporizer as recited in claim 1, wherein said first port is formed in the housing between the second chamber and an upper portion of the first chamber.

5. A vaporizer as recited in claim 4, wherein the first port extends horizontally.

6. A vaporizer as rectied in claim 1, wherein the housing comprises sealingly-connectable parts and the third chamber is located along a seam between said parts.

* * * * *